US010396634B2

(12) United States Patent
Han

(10) Patent No.: US 10,396,634 B2
(45) Date of Patent: Aug. 27, 2019

(54) SENSOR ASSEMBLY AND MOTOR INCLUDING THE SAME

(71) Applicant: LG INNOTEK CO., LTD., Seoul (KR)

(72) Inventor: Cheong Un Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 449 days.

(21) Appl. No.: 15/225,128

(22) Filed: Aug. 1, 2016

(65) Prior Publication Data

US 2017/0040874 A1 Feb. 9, 2017

(30) Foreign Application Priority Data

Aug. 5, 2015 (KR) .................. 10-2015-0110575

(51) Int. Cl.
*H02K 11/00* (2016.01)
*H02K 11/215* (2016.01)
*G01D 11/24* (2006.01)

(52) U.S. Cl.
CPC ......... *H02K 11/215* (2016.01); *G01D 11/245* (2013.01)

(58) Field of Classification Search
CPC ................. H02K 11/21; H02K 11/215; H02K 11/00–11/04

USPC ....................................................... 310/68 B
See application file for complete search history.

(56) References Cited

U.S. PATENT DOCUMENTS

| 2005/0082926 | A1* | 4/2005 | Grzywacz | ............ H02K 11/215 310/89 |
| 2011/0050212 | A1* | 3/2011 | Henning | ................ G01D 5/145 324/207.25 |
| 2012/0001623 | A1* | 1/2012 | Steinich | ............... G01D 11/245 324/207.25 |
| 2016/0254731 | A1* | 9/2016 | Roos | .................... H02K 11/215 310/43 |

FOREIGN PATENT DOCUMENTS

DE 102012208368 A1 11/2013
WO WO 2014/073587 A1 5/2014

* cited by examiner

*Primary Examiner* — Thomas Truong
(74) *Attorney, Agent, or Firm* — Birch, Stewart, Kolasch & Birch, LLP

(57) ABSTRACT

Disclosed herein are a sensor assembly including a holder that includes a first insertion groove formed at one side and a second insertion groove formed at the other side, a sensing magnet disposed at the first insertion groove, and a sensor cap that covers the sensing magnet, and a motor including the same.

20 Claims, 5 Drawing Sheets

[FIG. 1]
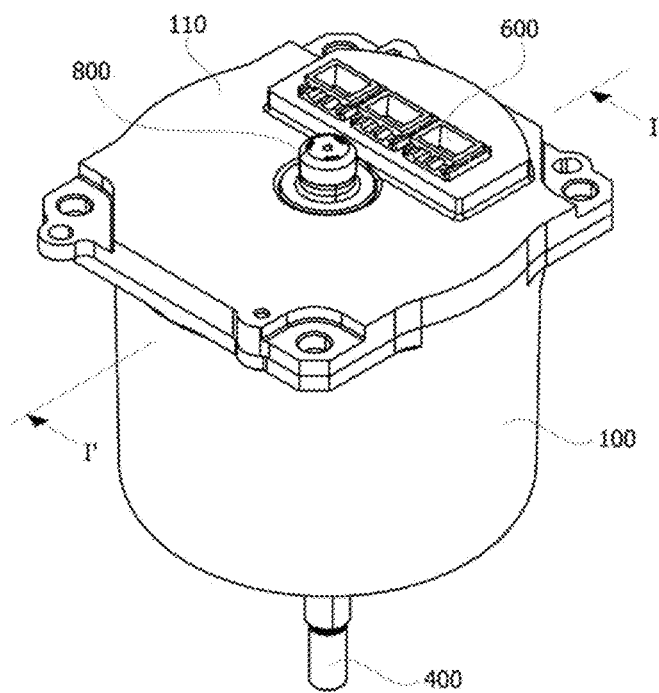

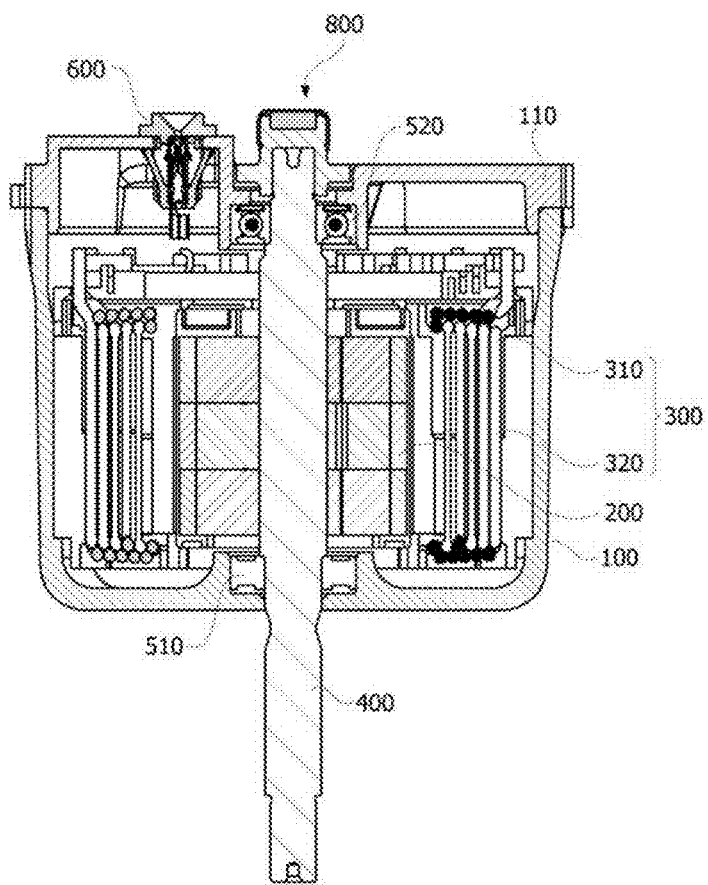
【FIG. 2】

[FIG. 3]
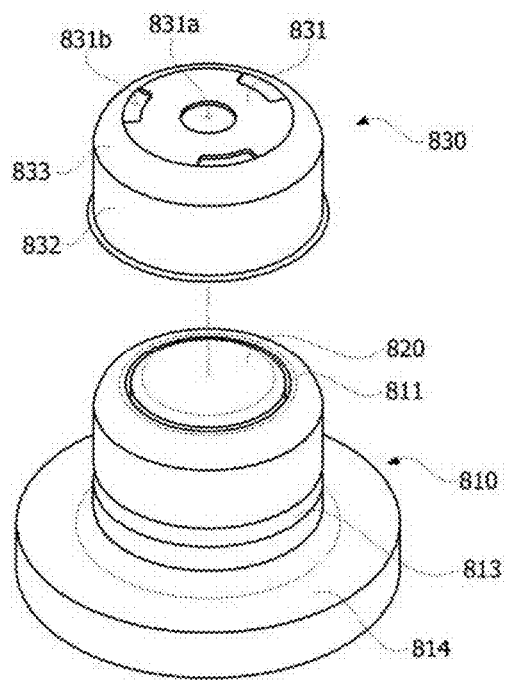
[FIG. 4]
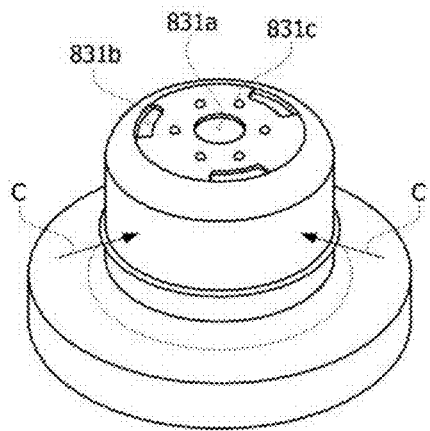

【FIG. 5】
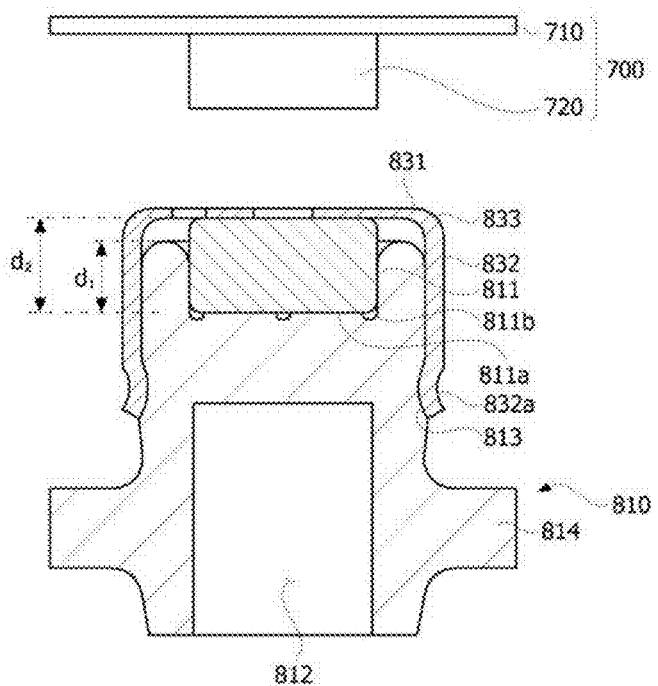
【FIG. 6A】
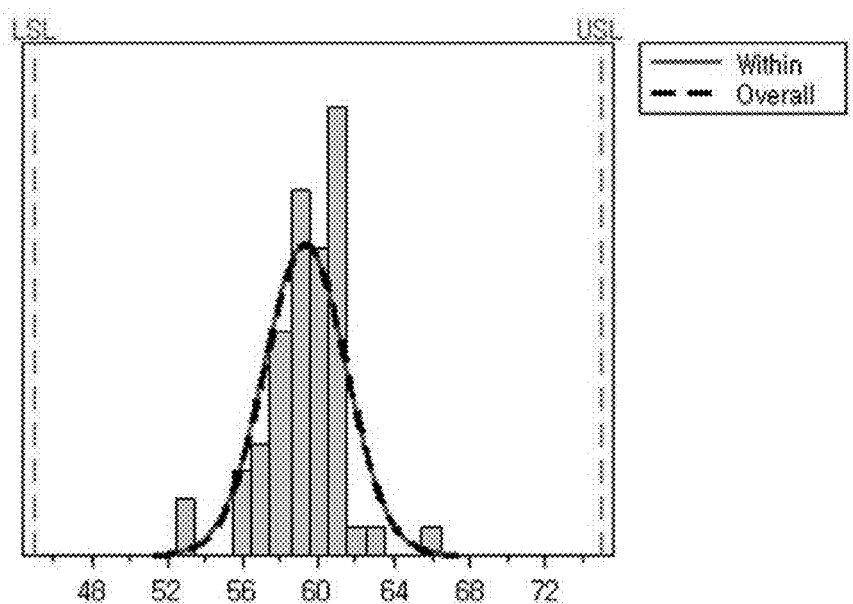

[FIG. 6B]
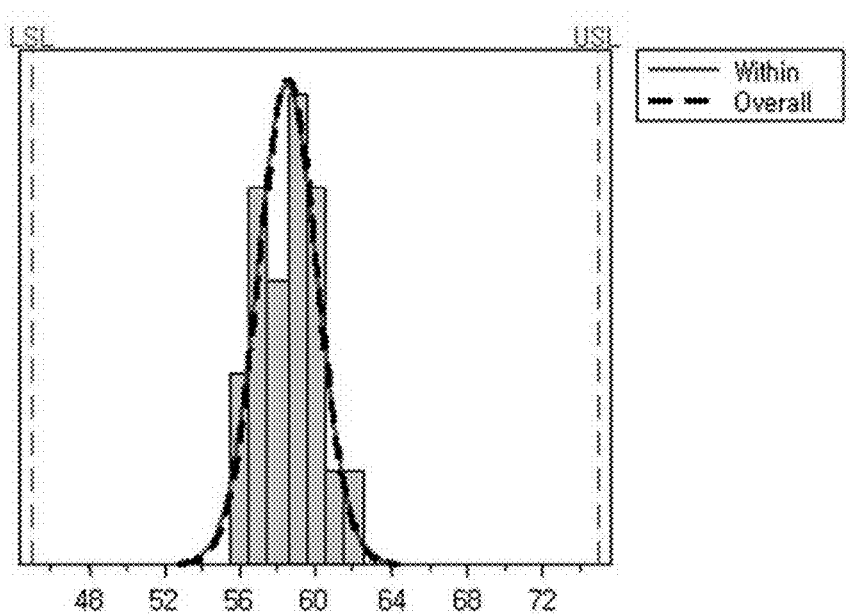

SENSOR ASSEMBLY AND MOTOR INCLUDING THE SAME

CROSS-REFERENCE TO RELATED APPLICATION

This application claims priority to and the benefit of Korean Patent Application No. 10-2015-0110575, filed on Aug. 5, 2015, the disclosure of which is incorporated herein by reference in its entirety.

BACKGROUND

1. Field of the Invention

Embodiments relate to a sensor assembly and a motor including the same.

2. Discussion of Related Art

Generally, a rotor of a motor rotates due to an electromagnetic interaction between the rotor and a stator. Here, a rotation shaft inserted into the rotor also rotates and generates a rotation driving force.

In addition, a detection unit including a magnetic element is disposed inside the motor. The magnetic element detects a magnetic force of a sensing magnet that rotates together with the rotor. Consequently, the current position of the rotor can be determined when the detected magnetic force of the sensing magnet is used.

Generally, the sensing magnet can be directly fixed to the rotation shaft using an adhesive and the like. However, using this method, it is difficult to manage an accurate bonding process, and the sensing magnet may become detached.

SUMMARY OF THE INVENTION

Thus, embodiments are directed to providing a sensor assembly capable of preventing detachment of a sensing magnet, and a motor including the same.

In addition, the embodiments are directed to providing a sensor assembly capable of accurately sensing a rotation of a rotor, and a motor including the same.

Objectives of the embodiments not limited to the above-mentioned objectives, and other objectives of the embodiments will be clearly understood by one skilled in the art from the following description.

According to an aspect of the present application, a sensor assembly includes a holder that includes a first insertion groove formed at one side and a second insertion groove formed at the other side, a sensing magnet disposed in the first insertion groove, and a sensor cap that covers the sensing magnet.

The second insertion groove may serve to be coupled to a rotation shaft of a motor.

The depth of the first insertion groove may be smaller than the thickness of the sensing magnet.

The holder may include a recessed groove formed in a circumferential direction.

The holder may include a ring-shaped wing portion that protrudes in a radial direction.

The holder and the sensor cap may include a nonmagnetic material.

The sensor cap may include a bottom portion that comes into contact with one surface of the sensing magnet and a side portion that is coupled to a side surface of the holder.

The sensor cap may include a fastening portion formed at the side portion to be coupled to the holder.

The thickness of the sensor cap may be 0.05 mm to 0.3 mm.

The sensor cap may include a connection portion that connects the bottom portion and the side portion to each other, and the connection portion may have a curvature.

The sensor cap may include a plurality of protrusions formed at the bottom portion.

The sensor cap may include a central hole formed at the center of the bottom portion and a plurality of sub-holes formed at an outside of the bottom portion.

According to an aspect of the present application, a motor includes a housing, a stator disposed in the housing, a rotor disposed along an inner perimeter of the stator, a rotation shaft that integrally rotates with the rotor, and any one of the configurations of the sensor assembly mentioned above.

The motor may include a detection unit that senses a rotation of the sensing magnet.

The detection unit may include a magnetic element that faces the bottom portion of the sensor cap, and a printed circuit board on which the magnetic element is disposed.

BRIEF DESCRIPTION OF THE DRAWINGS

The above and other objects, features and advantages of the present application will become more apparent to those of ordinary skill in the art by describing exemplary embodiments thereof in detail with reference to the accompanying drawings, in which:

FIG. 1 is a conceptual view of a motor according to an embodiment of the present application;

FIG. 2 is a cross-sectional view taken along line I-I' in FIG. 1;

FIG. 3 is an exploded perspective view of a sensor assembly according to an embodiment of the present application;

FIG. 4 is a perspective view of a sensor assembly according to an embodiment of the present application;

FIG. 5 is a conceptual view of a sensor assembly according to an embodiment of the present application;

FIG. 6A is a view illustrating a simulation result of measuring a magnetic flux when a sensor cap is not mounted; and FIG. 6B is a view illustrating a simulation result of measuring a magnetic flux when a sensor cap is mounted.

DETAILED DESCRIPTION OF EXEMPLARY EMBODIMENTS

Since various modifications may be made to the present application and the present application may have various embodiments, particular embodiments will be illustrated in the drawings and described.

However, this does not limit the present application to the particular embodiments, and all modifications, equivalents, and substitutes included in the spirit and scope of the present application should be construed as belonging to the present application.

In the application, terms such as "include" or "have" should be understood as indicating that features, number, steps, operations, elements, parts, or combinations thereof exist and not as precluding the existence of or the possibility of adding one or more other features, numbers, steps, operations, elements, parts, or combinations thereof in advance.

In addition, it should be understood that the drawings attached in the application may be exaggerated or minimized for convenience of description.

Hereinafter, the present application will be described in detail with reference to the drawings, while like reference numerals will be given to the same or corresponding elements regardless of signs in the drawings and overlapping descriptions thereof will be omitted.

FIG. 1 is a conceptual view of a motor according to an embodiment of the present application, and FIG. 2 is a cross-sectional view taken along line I-I' in FIG. 1

Referring to FIGS. 1 and 2, a motor according to an embodiment of the present application includes a rotation shaft 400, a rotor 200 that includes a hole into which the rotation shaft 400 is inserted, a stator 300 disposed along an outer perimeter of the rotor 200, a housing 100 that accommodates the rotor 200 and the stator 300, and a sensor assembly 800 that detects a rotation of the rotor 200.

The housing 100 has a cylindrical space in which the stator 300 and the rotor 200 may be mounted. Here, although the shape or material of the housing 100 may be modified in various ways, a metal material capable of resisting high temperature well may be selected as the material of the housing 100.

The housing 100 may be coupled to a cover 110 and accommodate the stator 300 and the rotor 200. The housing 100 may further include a cooling structure (not illustrated) to easily discharge internal heat. An air-cooling or water-cooling structure may be selected as the cooling structure, and the shape of the housing 100 may be properly changed according to the cooling structure.

A connector 600 connected to an external power supply is coupled to the cover 110. The connector 600 may have a structure into which an external power supply pin may be inserted. Consequently, power may be supplied to the stator 300 by easily inserting the external power supply pin into the connector 600.

The stator 300 is inserted into the inside space of the housing 100. The stator 300 includes a stator core 320 and a coil 310 wound around the stator core 320. The stator core 320 may be an integrated core formed in a ring shape or a structure in which a plurality of divided cores are coupled to each other.

The stator 300 may be properly changed according to the type of a motor. For example, a coil may be wound around an integrated stator core in the case of a direct current (DC) motor, and the stator 300 may also be manufactured such that U, V, and W phases are each input to a plurality of coils, in a case of a three-phase motor. Here, the connector 600 may be manufactured with three input terminals. A three-phase motor is illustrated in FIGS. 1 and 2. Consequently, three connectors 600 may be provided to be connected to U, V, and W phases, respectively.

The rotor 200 is rotatably disposed inside the stator 300. A rotor magnet is mounted on the rotor 200, and the rotor 200 rotates due to an electromagnetic interaction with the stator 300.

The rotation shaft 400 is coupled to a central portion of the rotor 200. The rotation shaft 400 integrally rotates with the rotor 200. Here, the rotation shaft 400 is supported by a first bearing 520 disposed at one side and a second bearing 510 disposed at the other side.

Since the sensor assembly 800 rotates together with the rotor and the rotation shaft 400, a rotation of the rotor 200 may be detected when a rotation of the sensor assembly 8800 is detected. Here, the motor may further include a detection unit (not illustrated) disposed at an upper end of the sensor assembly 800 for detecting a rotation.

FIG. 3 is an exploded perspective view of a sensor assembly according to an embodiment of the present application, and FIG. 4 is a perspective view of a sensor assembly according to an embodiment of the present application.

Referring to FIGS. 3 and 4, the sensor assembly includes a holder 810 coupled to the rotation shaft, a sensing magnet 820 disposed at the holder 810, and a sensor cap 830.

The holder 810 includes a first insertion groove 811 formed at one side and having the sensing magnet 820 disposed therein. An adhesive (not illustrated) may be applied between the first insertion groove 811 and the sensing magnet 820. Consequently, the sensing magnet 820 may be firmly fixed to the first insertion groove 811.

The sensing magnet 820 may be a bipolar magnet having an N-pole and an S-pole.

The holder 810 may be manufactured with a nonmagnetic material. Generally, since a magnetic flux has high air resistance, a larger amount of magnetic flux flows toward a magnetic body. Consequently, when the holder 810 is formed of a magnetic body, a larger amount of magnetic flux flows toward the holder 810. As a result, it becomes difficult to accurately sense a magnetic element disposed at the upper end of the sensing magnet.

According to an embodiment, since a magnetic flux leaking to the outside is blocked by the holder 810, there is an advantage in that sensitivity of a magnetic element 720 is improved. In addition, the same sensitivity can be maintained even when the size of the sensing magnet is decreased, thus allowing miniaturization of the sensing magnet.

The holder 810 includes a ring-shaped wing portion 814 that protrudes in the radial direction. The wing portion 814 may serve to adjust the center during a rotation and block a leaking magnetic flux at the same time. Consequently, the sensitivity increases.

The sensor cap 830 is press-fitted into the holder 810 to fix the sensing magnet 820. When exposed to an external environment such as vibration, high temperature, high humidity, etc., the sensor cap 830 prevents the sensing magnet 820 from detaching from the holder 810 or the height of the sensing magnet 820 from changing.

Particularly, when the sensing magnet 820 is tilted due to the adhesive being unevenly applied, there is an advantage in that the height of the sensing magnet 820 can be uniformly managed by the coupling of the sensor cap 830. That is, since an upper surface of the sensing magnet 820 is pressed as the sensor cap 830 is press-fitted into the holder 810, horizontality of the sensing magnet 820 can be controlled even without a separate process. The sensor cap 830 may be manufactured in a cup shape by press-forming a nonmagnetic material such as stainless steel (SUS).

The sensor cap 830 includes a bottom portion 831 that comes into contact with one surface of the sensing magnet 820, a side portion 832 that is coupled to a side surface of the holder 810, and a connection portion 833 that connects the bottom portion 831 and the side portion 832 to each other.

The bottom portion 831 presses an overall upper portion of the sensing magnet 820 protruding from the first insertion groove 811. Specifically, when the side portion 832 of the sensor cap is caulked (C) while the sensor cap 830 is coupled to an outer circumferential surface of the holder 810, the bottom portion 831 of the sensor cap presses the protruding upper portion of the sensing magnet 820. Here, the pressing force of the bottom portion 831 may vary according to the caulking strength.

The caulking (C) may be formed at a portion corresponding to a recessed groove 813 of the holder 8101. Consequently, a fastening portion corresponding to the recessed groove 813 of the holder 810 is formed at the side portion 832 of the sensor cap. Here, caulking may be a concept that includes various coupling methods for fixing the sensor cap 830 to the holder 810. For example, caulking may be a punching process. However, a method of fixing the sensor cap 830 to the holder 810 is not necessarily limited thereto. For example, the sensor cap 830 may also be coupled to the holder 810 by screws. Here, screw threads may be formed at an inner circumferential surface of the sensor cap 830 and an outer circumferential surface of the holder 810.

The bottom portion 831 may include a central hole 831a formed at the center and a plurality of sub-holes 831b formed outside thereof. The height of the sensing magnet 820 may be measured using the central hole 831a, and whether the sensing magnet 820 is bonded may be observed by visual inspection using the sub-holes 831b.

The bottom portion 831 may include a plurality of protrusions 831c that are convexly or concavely formed. The bottom portion 831 may maintain flatness by the plurality of protrusions 831c. The protrusions 831c may be formed before the sensor cap 830 is mounted on the holder 810 or after the sensor cap 830 is press-fitted into the holder 810.

The connection portion 833 is a portion that connects the bottom portion 831 and the side portion 832 to each other and may have a predetermined curvature when press-formed. Although the sensor cap 830 is manufactured with a nonmagnetic material as described above, the sensor cap 830 may have magnetism when the sensor unit 833 has a curvature of a threshold value or higher. When the radius of curvature R of the connection portion 833 is controlled to be 0.5 mm or less, a phenomenon in which the connection portion 833 has magnetism may be effectively suppressed.

FIG. 5 is a conceptual view of a sensor assembly according to an embodiment of the present application.

Referring to FIG. 5, a detection unit 700 may be disposed at the upper end of the sensor assembly to detect a rotation of the sensing magnet 820.

The detection unit 700 includes the magnetic element 720 that detects a rotation of the sensing magnet 820 and a printed circuit board 710. The magnetic element 720 may be mounted on one surface of the printed circuit board 710 to be disposed to face the bottom portion 831 of the sensor cap and the sensing magnet 820. The magnetic element 720 may be a Hall IC.

The holder 810 includes the first insertion groove 811 formed at one side and a second insertion groove 812 formed at the other side to have the rotation shaft 400 coupled thereto.

A plurality of sub-grooves 811b may be formed at a bottom surface 811a of the first insertion groove 811, and an overfilled adhesive may be accommodated therein.

The second insertion groove 812 is formed with a width and a depth of an extent appropriate for rotation shaft coupling. Since the diameter of the rotation shaft is different depending on the structure of the motor, a diameter of the second insertion groove 812 may be the same as or different from a diameter of the first insertion groove 811.

A depth d1 of the first insertion groove 811 is formed to be smaller than a thickness d2 of the sensing magnet 820. That is, the upper portion of the sensing magnet 820 protrudes sideward with respect to the first insertion groove 811. Consequently, the sensing magnet 820 is pressed by the bottom portion 831 of the sensor cap 831, and the height of the sensing magnet 820 is controlled to be uniform. Here, the height of the sensing magnet 820 may be defined as the distance between the upper surface of the sensing magnet 820 and the magnetic element 720.

A fastening portion 832a coupled to the recessed groove 813 of the holder 810 is formed at the side portion 832 of the sensor cap 830. As described above, the fastening portion 832a may be formed by punching or caulking.

The thickness of the sensor cap 830 may satisfy being in a range of 0.05 mm to 0.3 mm. When the thickness of the sensor cap 830 is less than 0.05 mm, it is difficult to have an effect of pressing and fixing the sensing magnet 820 since the thickness is too small. When the thickness exceeds 0.3 mm, there is a problem in that sensitivity decreases due to a magnetic flux of the sensing magnet 820 being blocked.

The holder 810 includes the ring-shaped wing portion 814 that protrudes in the radial direction. A diameter W4 of the wing portion 814 may be 1.2 to 2.0 times a diameter W3 of the holder 810. When the diameter W4 of the wing portion 814 is less than 1.2 times the diameter W3 of the holder 810, a function of blocking a leaking magnetic flux is degraded. When the diameter W4 of the wing portion 814 is larger than 2.0 times the diameter W3 of the holder 810, it may be disadvantageous in terms of high speed rotation due to the diameter being too large.

Referring to FIGS. 6A and 6B, a sensor assembly without a sensor cap and a sensor assembly on which a sensor cap having a thickness of 0.15 mm is mounted were prepared, spaced apart from a magnetic element by 0.28 mm, and magnetic flux density was measured.

As a result of the measurement, it can be recognized that a sample mean of the magnetic flux density is about 60 in both cases regardless of a presence of the sensor cap 830, and there is also no significant difference in the range of dispersion.

Consequently, it can be recognized that the sensing magnet can be effectively protected while maintaining the sensitivity of the sensing magnet when the thickness of the sensor cap is controlled to be 0.05 mm to 0.3 mm.

According to an embodiment, a possibility of a sensing magnet being detached due to an external environment decreases, thereby ensuring reliability.

In addition, the height of the sensing magnet can be easily adjusted, and the sensitivity of the sensing magnet can be improved.

The above description is only an example describing the technological scope of the present application. Various changes, modifications, and replacements may be made by those skilled in the field of the present technology without departing from the spirit and scope of the present application. Therefore, the embodiments and the accompanying drawings disclosed above should be considered in a descriptive sense only and not for limiting the technological scope. The technological scope of the present application is not limited by these embodiments and the accompanying drawings. The spirit and scope of the present application should be interpreted by the appended claims and as encompassing all equivalents falling within the scope of the appended claims.

DESCRIPTION OF SYMBOL

100: HOUSING
200: ROTOR
300: STATOR
400: ROTATION SHAFT
800: SENSOR ASSEMBLY
810: HOLDER
820: SENSING MAGNET
830: SENSOR CAP

What is claimed is:

1. A sensor assembly comprising:
a holder including a side surface and a bottom surface;

a first insertion groove formed in the bottom surface of the holder;

a sensing magnet disposed in the first insertion groove, a bottom surface of the sensing magnet extending below the bottom surface of the holder; and a sensor cap configured to cover the sensing magnet, the sensor cap having a bottom portion contacting the bottom surface of the sensing magnet, and a side portion extending over and fixed to the side surface of the holder.

2. The sensor assembly of claim 1, wherein the holder includes a second insertion groove formed at a top surface of the holder, and wherein the second insertion groove serves to be coupled to a rotation shaft of a motor.

3. The sensor assembly of claim 1, wherein a depth of the first insertion groove is smaller than a thickness of the sensing magnet.

4. The sensor assembly of claim 1, wherein the holder includes a recessed groove formed in a circumferential direction, and wherein a fastening portion of the side portion of the sensor cap engages the recessed groove to fix the sensor cap to the holder.

5. The sensor assembly of claim 1, wherein the holder includes a ring-shaped wing portion configured to protrude in a radial direction from the side surface of the holder, and wherein a diameter of the wing portion is 1.2 to 2.0 times a diameter of the holder.

6. The sensor assembly of claim 1, wherein the holder and the sensor cap include a nonmagnetic material.

7. The sensor assembly of claim 1, wherein the bottom portion of the sensor cap directly contacts the bottom surface of the sensing magnet.

8. The sensor assembly of claim 1, wherein a thickness of the sensor cap is 0.05 mm to 0.3 mm.

9. The sensor assembly of claim 1, wherein the sensor cap includes a connection portion configured to connect the bottom portion and the side portion to each other, and the connection portion has a curvature.

10. The sensor assembly of claim 1, wherein the sensor cap includes a plurality of protrusions formed at the bottom portion.

11. The sensor assembly of claim 1, wherein the sensor cap includes a central hole formed at a center of the bottom portion and a plurality of sub-holes formed at an outside of the bottom portion.

12. The sensor assembly of claim 1, further comprising:
grooves formed in a bottom surface of the first insertion groove; and adhesive on the bottom surface of the first insertion groove, wherein a top surface of the sensing magnet contacts the adhesive to retain the sensing magnet in the first insertion groove.

13. A motor comprising:
a rotation shaft;
a rotor including a hole into which the rotation shaft is inserted;
a stator disposed along an outer perimeter of the rotor;
a housing configured to accommodate the rotor and the stator; and
a sensor assembly configured to detect a rotation of the rotor, wherein the sensor assembly includes:
a holder including a side surface and a bottom surface;
a first insertion groove formed in the bottom surface of the holder;
a sensing magnet disposed at the first insertion groove, a bottom surface of the sensing magnet extending below the bottom surface of the holder; and
a sensor cap configured to cover the sensing magnet, the sensor cap having a bottom portion contacting the bottom surface of the sensing magnet, and a side portion extending over and fixed to the side surface of the holder.

14. The motor of claim 13, further comprising a detection unit configured to sense a rotation of the sensing magnet.

15. The motor of claim 14, wherein the detection unit includes a magnetic element configured to face the bottom portion of the sensor cap, and a printed circuit board on which the magnetic element is disposed.

16. The motor of claim 13, wherein the holder includes a second insertion groove formed at a top surface of the holder, and the second insertion groove is coupled to the rotation shaft of the motor.

17. The motor of claim 13, wherein a depth of the first insertion groove is smaller than a thickness of the sensing magnet.

18. The motor of claim 13, wherein the holder includes a recessed groove formed in a circumferential direction, and
wherein a fastening portion of the side portion of the sensor cap engages the recessed groove to fix the sensor cap to the holder.

19. The motor of claim 13, wherein the holder includes a ring-shaped wing portion configured to protrude in a radial direction from the side surface of the holder, and
wherein a diameter of the wing portion is 1.2 to 2.0 times a diameter of the holder.

20. The motor of claim 13, wherein the holder and the sensor cap include a nonmagnetic material.

* * * * *